July 3, 1951 — H. K. FERGER — 2,559,292
ANTIFRICTION BEARING FOR SLIDING MEMBERS
Filed Jan. 11, 1945 — 2 Sheets-Sheet 1
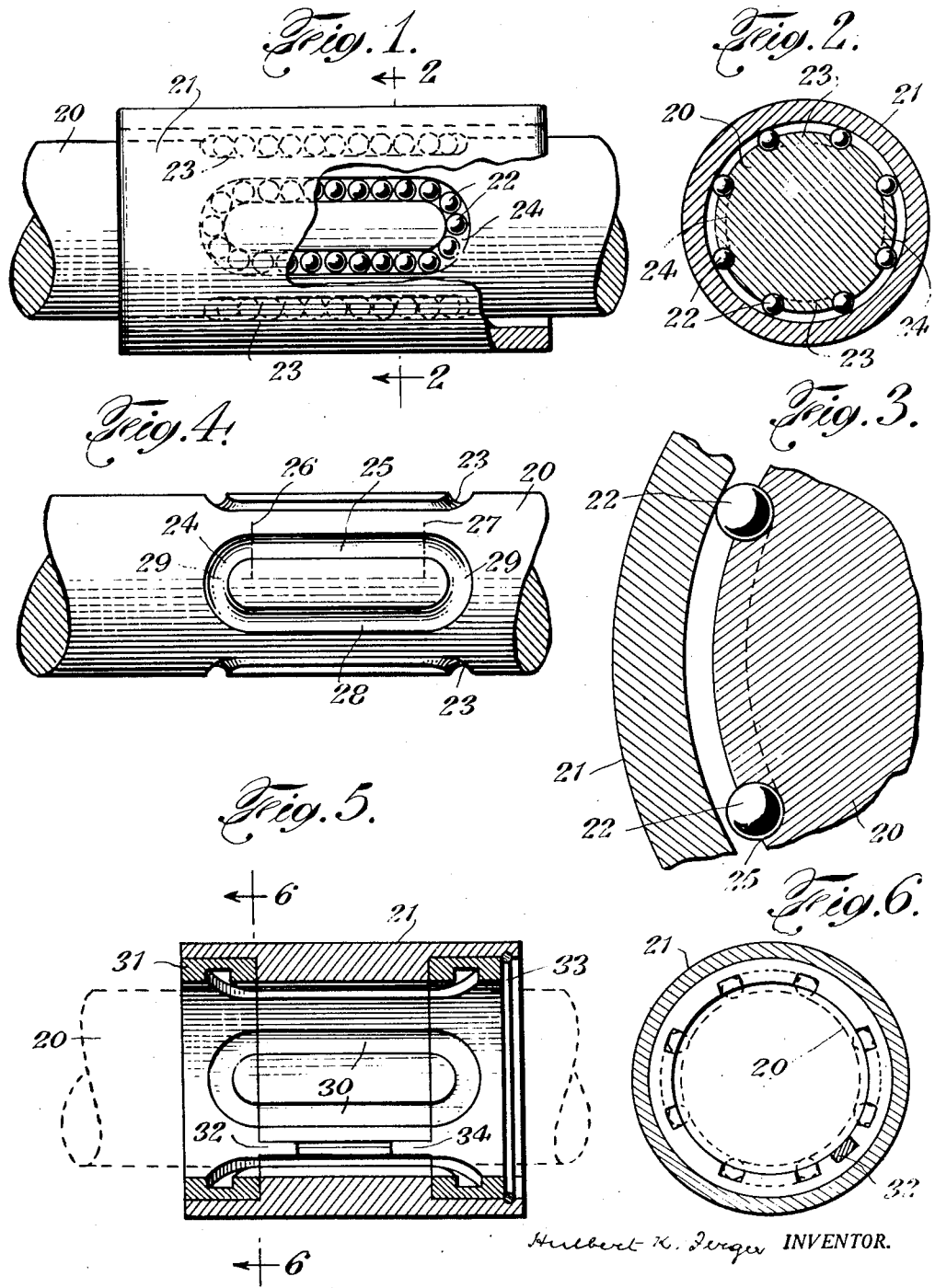

July 3, 1951  H. K. FERGER  2,559,292
ANTIFRICTION BEARING FOR SLIDING MEMBERS
Filed Jan. 11, 1945  2 Sheets-Sheet 2
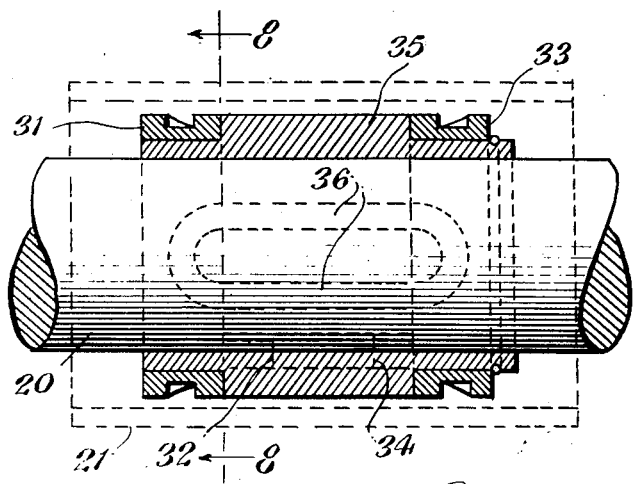
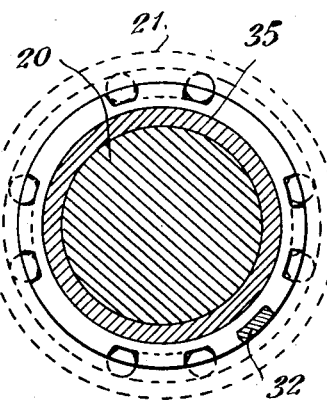
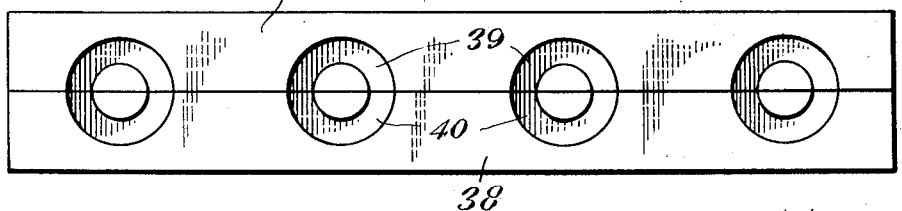
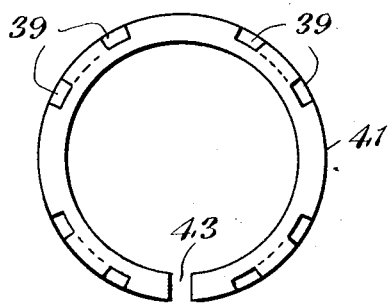
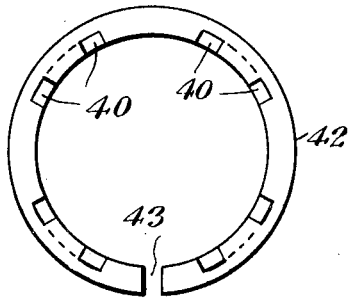
Hulbert K. Ferger INVENTOR.
BY
Emery, Varney, Whittemore & Dix,
Attorneys.

Patented July 3, 1951

2,559,292

UNITED STATES PATENT OFFICE 2,559,292

ANTIFRICTION BEARING FOR SLIDING MEMBERS

Hulbert K. Ferger, Flushing, N. Y., assignor of one-half to John B. Thomson, Plandome, N. Y.

Application January 11, 1945, Serial No. 572,404

4 Claims. (Cl. 308—6)

While my improvement may be applied to any two members which have a relative linear movement the one on the other, it is here shown, for purposes of illustration and description, as applied to two members which are disposed one within the other and which, in addition to their linear movement, may have relative rotary movement.

In the accompanying drawings,

Fig. 1 is a view in elevation, partly broken away, of a portion of a shaft with a sleeve movable longitudinally thereon, to which my improvement has been applied;

Fig. 2 is a transverse section thereof on a plane indicated by the line 2—2 in Fig. 1;

Fig. 3 is a view on a larger scale of a portion of the section shown in Fig. 2;

Fig. 4 is a view similar to Fig. 1 with the sleeve and balls removed;

Fig. 5 is a view in longitudinal section showing a modification of the sleeve, the shaft being indicated in dotted lines;

Fig. 6 is a transverse section thereof taken on a plane indicated by the line 6—6 in Fig. 5;

Fig. 7 is a view similar to that of Fig. 5 showing another modification;

Fig. 8 is a transverse section thereof on a plane indicated by the line 8—8 in Fig. 7;

Fig. 9 is a plan view of two strips of metal secured together for cutting circular grooves therein; and Figs. 10 and 11 are respectively views in elevation of rings formed from the two strips cut as shown in Fig. 9.

Referring first to Figs. 1-4 inclusive, the two members there shown, namely, the shaft 20 and the sleeve 21, have their opposing faces separated by bearing balls 22 which substantially fill four race-way circuits provided by two pairs, 23 and 24, of separate continuous grooves formed in the periphery of the shaft, the grooves of each pair being oppositely disposed, that is, diametrically opposite each other. Each groove has a straight portion 25 (denoted in Fig. 4 as lying between the lines 26 and 27) which is shallower, as indicated in Fig. 3, or at least a part of which is shallower, than the remaining portion of the groove; and the bearing balls are of such diameter, relative to the space between the opposing faces of the shaft and sleeve, that only the balls which are contained in the shallower portions of the grooves at any moment will have bearing contact with both of the opposing faces of the shaft and sleeve so as to constitute an anti-friction bearing between those faces. The shallow portion 25 of each groove is substantially parallel to the direction of linear movement between the two members 20 and 21; and the remaining portion of each groove preferably comprises another straight portion 28 of substantially the same length as and substantially parallel to the shallow straight portion 25, and two curved end portions 29 (Fig. 4) joining respectively the adjacent ends of the two straight portions. Except as shown in the enlarged scale view of Fig. 3, the relative depths of the different portions of the grooves is not indicated in the drawings.

Thus, in operation, the balls contained in the shallower portion 25 of each groove will, on account of their working contact with both opposing faces of the members 20 and 21, be caused to move along that portion of each groove in one direction or the other in accordance with the linear movement of the members 20 and 21, and will be discharged, one at a time, into one or the other of the curved end portions of each groove; and the movement of the balls in each portion 25 will cause all the other balls in each groove to move with them since the other balls are freely movable on account of the greater depth of the portion of each groove in which they are contained. Moreover, as each ball is discharged from one end of the shallower portion of any groove, a ball will be pushed into the shallower portion at the other end of that groove. It will be noted that the balls are exposed to the opposing face of the sleeve 21 throughout the entire circuit of each race-way groove.

In Figs. 5 and 6, the interior face of the sleeve 21, rather than the periphery of the shaft, is shown as containing the aforesaid race-way grooves which, as before, may comprise two straight portions and two curved portions connecting respectively the adjacent ends of the straight portions, and one of the straight portions is shallower than the remaining portions of the groove. In such a case, since it will be difficult, if not impracticable, to cut or otherwise form the curved ends of the grooves in the interior face of the sleeve itself, the curved end portions of the grooves may be cut, molded or cast in separate pieces which are then inlaid in the ends of the sleeve and keyed thereto so as to register properly with the straight portions 30 of the grooves formed in the sleeve. At the left-hand end of Fig. 5, for example, a ring 31, in which all the curved portions of the grooves at that end have been cut, molded or cast, is shown as press-fitted in that end of the sleeve and held in proper position to register with the straight portions of the grooves, by a key 32; and at the right-hand end of the sleeve a similar ring containing all the curved portions of the grooves at that end, is shown as being secured in that end of the sleeve by a snap-ring 33 and likewise retained in proper position by a key 34. It is immaterial, of course, whether one or both of said rings are secured within the ends of the sleeve by being press-fitted therein or by a snap-ring.

In Figs. 7 and 8 the shaft 20 is shown as having a collar 35 secured thereto in the periphery of which the straight portions 36 of the grooves are formed; and the curved end portions of the grooves are cut, molded or cast as separate rings secured on each end of the collar and may be press-fitted thereto or held in place by a snap-ring, and caused to retain their proper registering positions, by keys, as in the case illustrated in Figs. 5 and 6. The curved ends of the grooves in this case, however, are formed on the exterior of the rings instead of on the interior of the rings, to register with the straight grooves in the periphery of the collar which in this case constitutes the face opposed to the internal face of the sleeve.

In both of the cases illustrated in Figs. 5 to 8 inclusive, the rings which are to be inlaid in the faces respectively of the sleeve and collar, as just explained, may be of moldable plastic material or of castable metal. But the material of these rings may, if desired, be of steel or other hard metal in which case the curved ends of the grooves will generally be cut therein. For this purpose the curved ends of the grooves may be cut in a straight strip or strips of steel or other hard metal and the latter thereafter bent to form rings from the strips so cut. Figs. 9 to 11 inclusive illustrate how this may be done, Fig. 9 showing two straight strips 37 and 38 of steel placed and held together edge to edge and while so held having four circular grooves cut therein, one half 39 of each groove in one strip and the other corresponding half 40 in the other; and Figs. 9 and 10 showing each strip so cut, bent into the form of a ring, one of these rings 41 having the grooves in its periphery and the other 42 having the grooves in its inner face, and a keyway 43 cut in each.

I claim:

1. An anti-friction bearing for longitudinal travel on a shaft or the like, comprising, in combination with the shaft, a sleeve provided with a plurality of pairs of longitudinally extending ball-guides having bearing-balls therein all of the same size, the balls in one of the guides of each said pair being in bearing contact with both the shaft and sleeve while the balls in the other guide of that pair are not in bearing contact with the shaft and sleeve but are free to travel therein, said sleeve having a counter-bore at each end thereof, separately formed pieces secured in said counter-bores and providing within the respective areas defined by the counter-bores a plurality of approximately semi-circular ball-guides the ends of each of which are continuous with the respective adjacent ends of one of the said pairs of longitudinal ball-guides, and bearing balls in each of the semi-circular ball-guides of the same size as the aforesaid bearing-balls but not in bearing contact with the shaft and sleeve.

2. The combination of two members having relative longitudinal movement the one on the other, the opposing face of one of said members being provided with a counter-sunk portion at each end and said face having therein a pair of grooves extending longitudinally from the counter-sunk portion at one of said ends to the counter-sunk portion at the other end, one of said grooves being shallower than the other, two separately formed pieces each of which has in one face thereof a curved groove deeper than the aforesaid shallower longitudinal groove and which pieces are fitted to and retained in the respective counter-sunk portions aforesaid with the ends of the curved grooves in register with the adjacent ends respectively of the aforesaid longitudinal grooves, and bearing balls substantially filling all of the grooves and of such size that only those balls contained at any moment in the shallower longitudinal groove are in bearing contact with the opposing face of said other member.

3. The combination with a shaft, of a sleeve loosely fitted thereto for longitudinal movement thereon and having a counter-bore at each end, said sleeve also having a plurality of pairs of grooves in its inner surface extending longitudinally from the counter-bore at one end to the counter-bore at the other end and one groove of each said pair being shallower than the other groove of that pair, two rings each of which has in its inner surface the same number of curved grooves as there are pairs of longitudinal grooves and each of which curved grooves is deeper than the shallower groove of the corresponding longitudinal pair, said rings being fitted to and retained in the aforesaid counter-bores with the ends of each curved groove in register with the adjacent ends respectively of the corresponding pair of longitudinal grooves, and bearing-balls substantially filling all of the grooves and of such size that only those balls contained at any moment in the shallower grooves will be in bearing contact with the shaft and sleeve.

4. An anti-friction bearing for longitudinal travel on a shaft or other member, comprising, in combination with said member, a sleeve having a counter-sunk portion at each end and being provided with a plurality of pairs of longitudinal ball-grooves extending from the counter-sunk portion at one end to the counter-sunk portion at the other end, one of the grooves of each said pair being of a slightly different depth from that of the other groove of that pair, a ring fitted to the counter-sunk portion at each end of the sleeve and having the same number of semi-circular ball-grooves as there are pairs of longitudinal ball-grooves and each of which is of a depth greater than that of the shallower groove of the corresponding longitudinal pair, each said ring being so disposed in said counter-sunk portion that the ends of each semi-circular groove will be in register respectively with the adjacent ends of a pair of longitudinal grooves, and bearing balls substantially filling all of the grooves and of such diameter that those at any moment in the shallower longitudinal grooves will have bearing contact with both said sleeve and said member.

HULBERT K. FERGER.

REFERENCES CITED

The following references are of record in the file of this patent:

UNITED STATES PATENTS

| Number | Name | Date |
|---|---|---|
| 640,397 | Merker | Jan. 2, 1900 |
| 782,347 | Lidback | Feb. 14, 1905 |
| 2,355,317 | Moore | Aug. 8, 1944 |

FOREIGN PATENTS

| Number | Country | Date |
|---|---|---|
| 75,478 | Sweden | 1931 |
| 755,957 | France | 1933 |
| 429,976 | Great Britain | 1935 |